(12) United States Patent
Block

(10) Patent No.: US 6,863,337 B2
(45) Date of Patent: Mar. 8, 2005

(54) TRUCK SHELL

(76) Inventor: David C. Block, 136 Sierra Vista Dr., Redlands, CA (US) 92373

( * ) Notice: Subject to any disclaimer, the term of this patent is extended or adjusted under 35 U.S.C. 154(b) by 0 days.

(21) Appl. No.: 10/615,741

(22) Filed: Jul. 8, 2003

(65) Prior Publication Data
US 2004/0007900 A1 Jan. 15, 2004

Related U.S. Application Data

(63) Continuation of application No. 10/022,030, filed on Dec. 14, 2001, now Pat. No. 6,588,819.

(51) Int. Cl.[7] .............................. B62D 33/027
(52) U.S. Cl. ................ 296/186.4; 296/164; 296/100.02
(58) Field of Search ........................... 296/26.04, 182.1, 296/186.4, 10, 163–164, 36, 102, 100.02, 183; D12/99–100, 404; 49/40

(56) References Cited

U.S. PATENT DOCUMENTS

| 2,926,402 | A | * | 3/1960 | Styron ........................... 49/54 |
| 3,399,922 | A | | 9/1968 | Burton |
| 4,305,614 | A | * | 12/1981 | Holka et al. ............. 296/37.16 |
| 4,343,504 | A | * | 8/1982 | Tomioka et al. .............. 296/76 |
| 4,556,248 | A | | 12/1985 | Kobayashi |
| 5,593,201 | A | * | 1/1997 | Bateman ................ 296/100.02 |
| 5,667,268 | A | * | 9/1997 | Bump ....................... 296/37.6 |
| 6,176,540 | B1 | | 1/2001 | Whittaker |

FOREIGN PATENT DOCUMENTS

| GB | 2181699 | * | 1/1987 | ................ 296/106 |
| JP | 360045444 | * | 3/1985 | .............. 296/146.9 |

* cited by examiner

Primary Examiner—Dennis H. Pedder
(74) Attorney, Agent, or Firm—Knobbe, Martens, Olson & Bear, LLP

(57) ABSTRACT

A molded truck shell having side walls hinged along the top of the shell, allowing the entire side wall to pivot upwardly and outwardly, providing increased access to cargo stored in a truck bed. Additional lateral seams between the side wall and shell are located on the front and rear of the shell rather than on the side of the shell thereby further increasing the opening into the truck bed and creating a visually clean appearance. Water penetrating through the side wall hinge line is directed away from the interior of the truck bed by a moisture flange that conducts the water to the exterior of the truck.

32 Claims, 6 Drawing Sheets

TRUCK SHELL

RELATED APPLICATIONS

This application is a continuation of U.S. application Ser. No. 10/022,030, filed Dec. 14, 2001 issued Jul. 8, 2003 as U.S. Pat. No. 6,588,819 which is hereby incorporated in its entirety herein.

BACKGROUND OF THE INVENTION

1. Field of the Invention

The invention relates to a shell accessory for a pick up truck. More specifically, a truck shell is disclosed that allows the entire side of the shell to be opened to allow greater truck bed access than has previously been available.

2. Description of the Related Art

Pick up trucks are a unique vehicle in the sense that they have an open bed in which all sorts of loads may be carried. The truck bed is defined as the cargo carrying area beginning immediately behind the truck cab, defined laterally by the side walls of the vehicle, and being bounded at the rear by a tailgate. The advantage a truck provides over other types of vehicles, in addition to sheer cargo volume, is the ability to easily access the cargo being carried in the truck bed. The bed is generally exposed, which allows access from all areas outside the truck by merely reaching over the side of the truck and into the truck bed. However, unrestricted access to the truck bed becomes a drawback when carrying environmentally sensitive or valuable cargo.

Consequently, truck owners may desire to cover, and oftentimes protect, the cargo carried in a truck bed. A popular way of covering a truck bed is installing an aftermarket truck shell. A truck shell is a rigid covering that encloses the truck bed from just behind the truck cab to the tailgate, thus creating an enclosed space. Oftentimes, the truck shell is made to conform to the shape and aesthetics of the truck to which it is attached.

One disadvantage of truck shells is that they limit access to the articles that are stored in the bed of the truck. Generally, access to the back of the truck is provided, in most truck shells, through a rear access door or opening which often comprises a transparent window that is hinged at its top such that it can be opened and thus provides access to the rear of the truck bed. The access is further enhanced when the truck's tailgate is lowered. The rear access door of traditional shells comprises the entire rear wall of the shell, thus allowing unrestricted access through the back of the truck when both the rear access door and tailgate are opened.

However, access to cargo items not located immediately in the back of the truck is still limited. In particular, when the articles that are needed to be accessed are positioned in the bed closer to the front end of the bed of the truck, the user must typically climb into the bed of the truck to retrieve the articles. This can, of course, be a significant inconvenience.

To address this problem, many shells are equipped with side openings that allow access to the bed of the truck via the side. These side openings are often in the form of hinged windows that are formed in the center of the side walls. Typically, the hinged windows are mounted in the center of the side walls so as to maintain the structural integrity of the side wall. However, windows that are formed in the side wall are typically smaller in size than the side wall such that access to all parts of the bed is at least partially obstructed by the side walls of the shell.

Moreover, side windows in shells can also be subject to water intrusion. Oftentimes, water can intrude into the interior of the vehicle through the seams between the hinged window and the surrounding shell structure. Of course, inhibiting water from entering the interior of the bed is one of the reasons pick up truck owners position shells on truck beds in the first place. To limit water intrusion, shell manufacturers often limit the size of the windows to limit the length of the seams and also generally position the hinges and seams on the side surface where water is less likely to intrude through the shell into the interior of the truck bed.

Hence, from the foregoing, there is an ongoing need for an improved shell design that allows for better access to the bed of a pick up truck while still inhibiting water intrusion into the bed of the pick up truck. To this end, there is provided an improved shell design that allows for greater side access to the bed of the truck while still limiting water intrusion wherein the side access is provided in a less obtrusive manner.

SUMMARY OF PREFERRED EMBODIMENTS

In one aspect, the doors are dimensioned to be at least as long as the side walls such that the interface between the doors and the side walls is positioned adjacent to the front and rear lateral edges of the side walls. In another aspect, the hinged attachment of the doors to the truck shell is formed adjacent the roof of the truck shell to further improve access and inhibit water intrusion.

Thus, in one embodiment, a truck shell is provided that provides an improved shell design that allows increased truck bed access by providing an openable door that covers a side wall of the shell. The side wall has an opening formed therein that is exposed upon opening of the door, thereby granting access to the truck bed. In one embodiment, a lip surrounds the periphery of the side wall opening and is contoured to direct water away from the opening and thus inhibits water from entering into the truck bed via the openings.

Thus, the truck shell of the present invention provides better access to the interior of the bed as the access openings can be made larger due to the larger size of the doors. Moreover, in one aspect, the positioning of the hinged interconnection between the door and the roof permits improved access and the use of lips extending outward from the openings inhibits water entry. These and other objects and advantages will become more apparent from the following description taken in conjunction with the accompanying drawings.

DETAILED DESCRIPTION OF PREFERRED EMBODIMENTS

Figure 1:
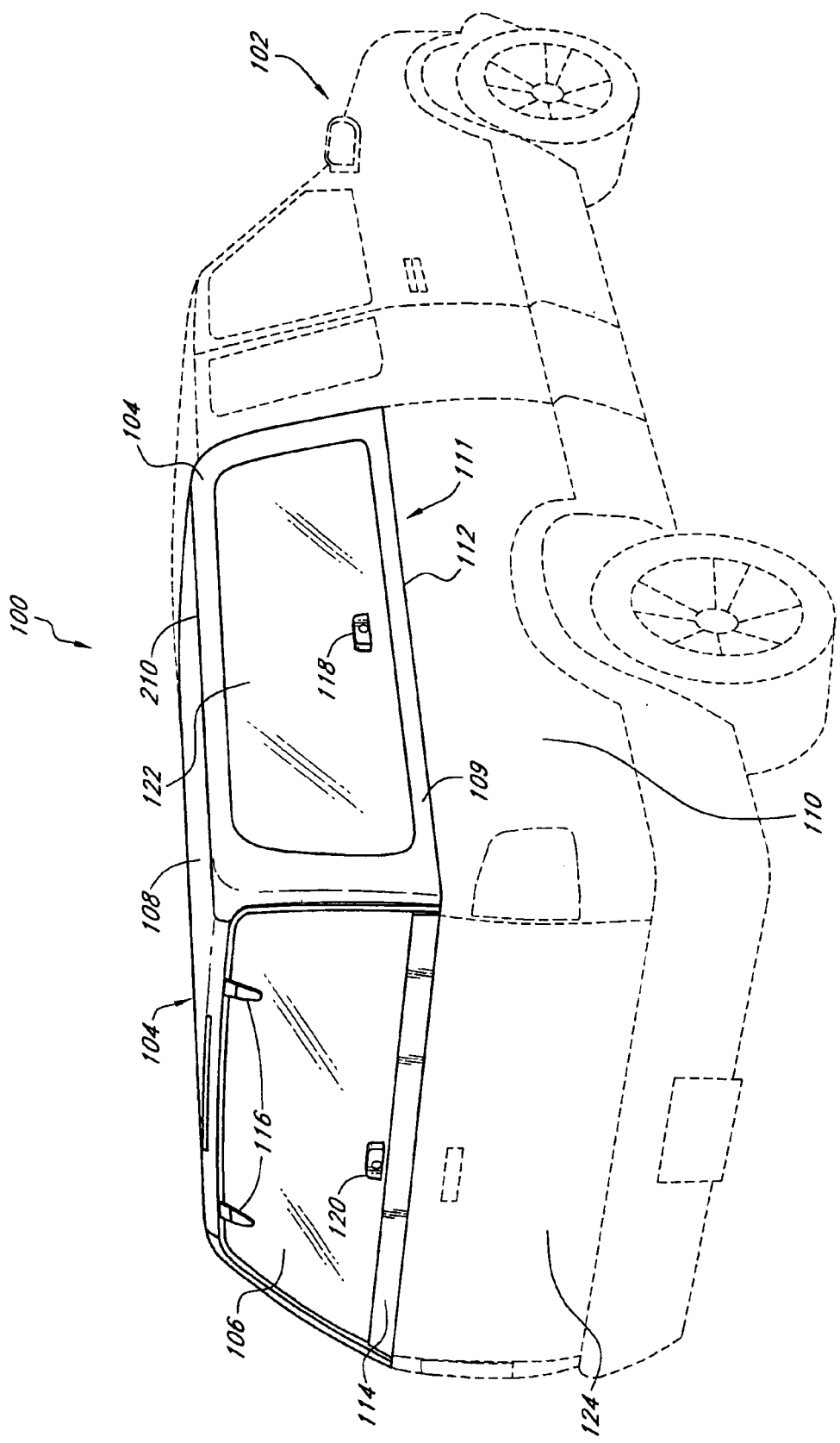
FIG. 1 is a perspective view of one embodiment of the present truck shell mounted to a pick up truck.

The truck shell is now described with respect to certain preferred embodiments and with reference to the attached drawings wherein like reference numerals are used to designate like parts throughout.

Referencing FIG. 1, one embodiment of the present truck shell is shown mounted to a bed of a pick up truck. Pick up trucks vary widely in size and shape between manufacturers, and between models of a single manufacturer. Consequently, each truck shell must be designed and molded for a specific model of truck. Hence, the description of the truck shell herein will be adaptable to all specific embodiments of truck shells.

Figure 2:
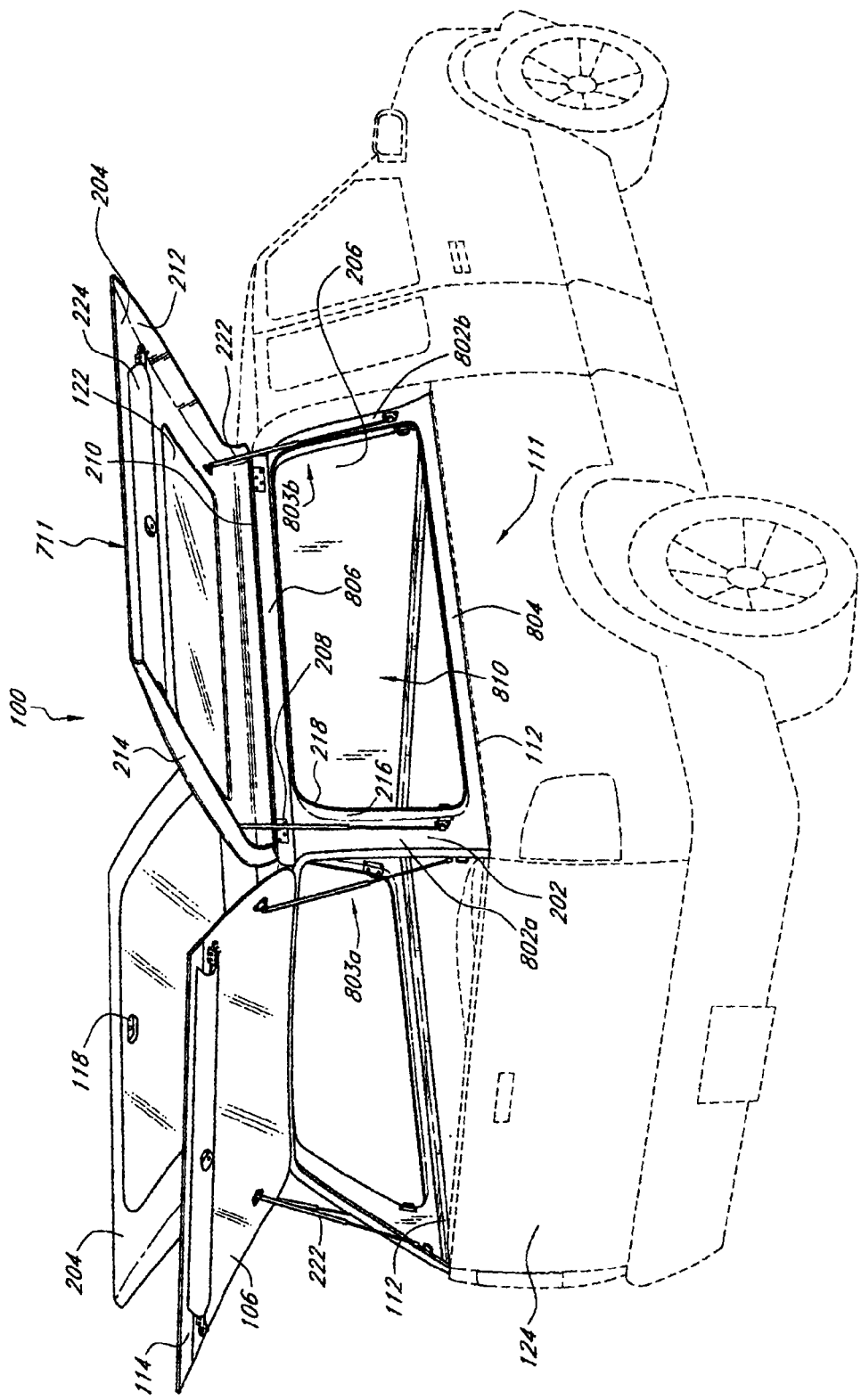
FIG. 2 is a perspective view showing one embodiment of the present truck shell mounted to a pick up truck with the side walls and rear wall open.

The truck shell 100 is shown mounted to a pick up truck 102 in a conventional manner. The shell 100 may be mounted by bolts, clamps, or any other suitable mechanism as is generally known in the art. The shell is defined by opposing side walls 104, a rear wall 106, a top ceiling surface or roof 108, and a front wall 206 (FIG. 2). The bottom of the shell 109 rests on the rails 111 of the truck bed sides 110 and creates a bottom seam 112 around the side walls 104 and front wall 206 of the shell 100. Generally, the top of the truck bed sides 110, or rails 111, are relatively flat which provide a mating surface for the bottom of the shell 109. Preferably, there is a compressible gasket (not shown) between the mating surfaces of the truck and shell to protect the finish of both surfaces as well as provide a seal to inhibit wind and water from entering the truck bed.

The rear wall 106 is attached to the shell 100 via a pair of cooperating hinges 116, as is known in the art, and is not supported by the tail gate 124, but rather, overlaps the tailgate 124 with a flexible rear sealing member 114 to allow water runoff to drain down the tailgate 124 exterior to the truck bed. The hinge arrangement allows the rear wall 106 to open upward and outward without interfering with the tailgate 124 as will be shown and described in later detail.

The side walls 104 in this embodiment are preferably provided with generous side windows 122, which combine with the rear wall 106 to allow the driver to view traffic out of all sides of the truck. These side windows 122 additionally allow viewing of the contents of the truck bed from outside the truck. The side walls 104 and rear wall 106 are openable via a pull latch 118, 120, respectively. The pull latches 118, 120 allow the shell to be opened for fast and easy access to cargo stored in the truck bed as will be described below.

Referring generally to FIG. 2, the shell 100 is shown with both side walls 104 and the rear wall 106 in an open configuration. The side walls are comprised of a support wall 202 and an outer side wall 204. In describing the embodiment pictured in FIG. 1, the general term "side wall", referenced by numeral 104, was used to refer to the combination of the support wall 202 and outer side walls 204, which, in some embodiments, may be considered a door. The support walls 202 and outer side walls 204 will now be referenced individually hereinafter. The support wall 202, in conjunction with the top ceiling 108 and the front wall 206, defines a supporting frame giving the shell 100 its structural support.

Figure 6:
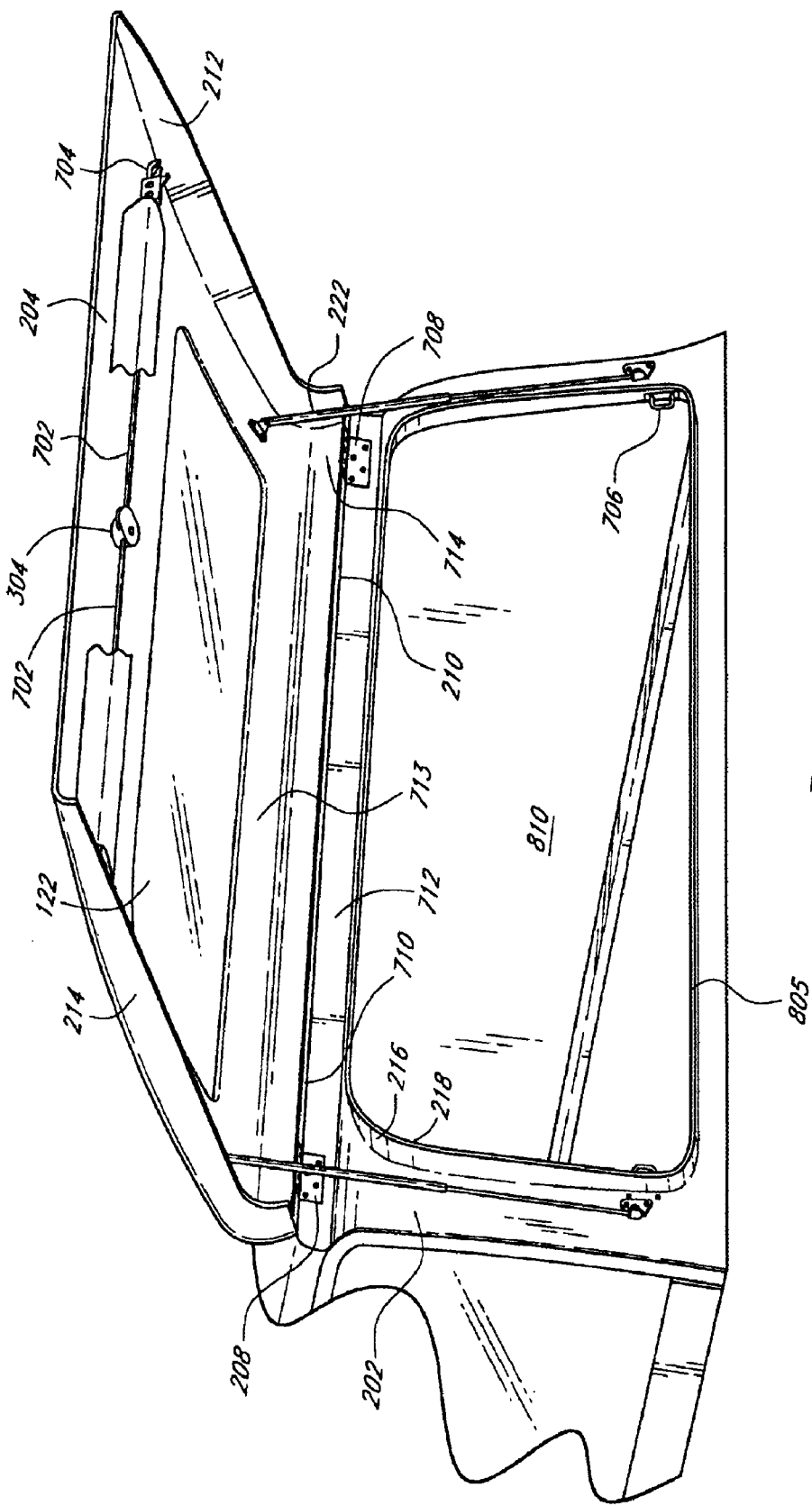
FIG. 6 is a perspective view of an outer side wall in its open position and details the moisture flange and support struts.

As is illustrated in FIGS. 2 and 6, each of the support walls 202 includes a first and second vertical support section 802a, 802b that are attached to the top ceiling 108 and are adapted to be positioned on the rail 111 of the truck bed. The first and second vertical support sections 802a, 802b are positioned at the lateral edges 803a, 803b of the support walls 202 adjacent the rear window 106 and front wall 206 respectively. Each of the support walls 202 further include a lower lateral section 804 and an upper lateral section 806 that interconnects the first and second vertical support sections 802a, 802b. The lower lateral section 804 defines the bottom edge 109 that is positioned on the rail 111 of the truck bed. The upper lateral section 806 is attached to the ceiling section 108 and is generally perpendicular thereto so as to provide a mounting location for the hinges that attach the outer side wall 204 to the support wall 202, as will be described below.

As is understood, the support sections, 802a, 802b, 804 and 806 are preferably molded so as to be integrally attached to each other in this embodiment. Collectively, they are contoured so as to define an access opening 810 through which access to the interior of the truck bed can be obtained. As is illustrated, the opening 810 extends substantially along the length of the side walls 104 so as to permit access to substantially all of the length of the truck bed. Both the length and width of the openings 810 can be increased as a result of the manner in which the movable side walls 204 are attached to the rest of the shell 100.

In particular, the outer side wall or door 204 includes a generally planar surface 711 that defines the window 122. Inwardly extending flanges 212, 214 are positioned at the front and rear lateral edges of the generally planar surface 711. The inwardly extending flanges 212, 214 extend in a direction that is perpendicular to the plane of the generally planar surface 711 in the manner shown in FIG. 6 and the outer side wall 204 is preferably dimensioned such that the inwardly extending flanges 212, 214 are positioned adjacent the rear 106 and the front 206 of the truck shell 100 when the outer side wall 204 is in the closed position shown in FIG. 1.

Figure 4:
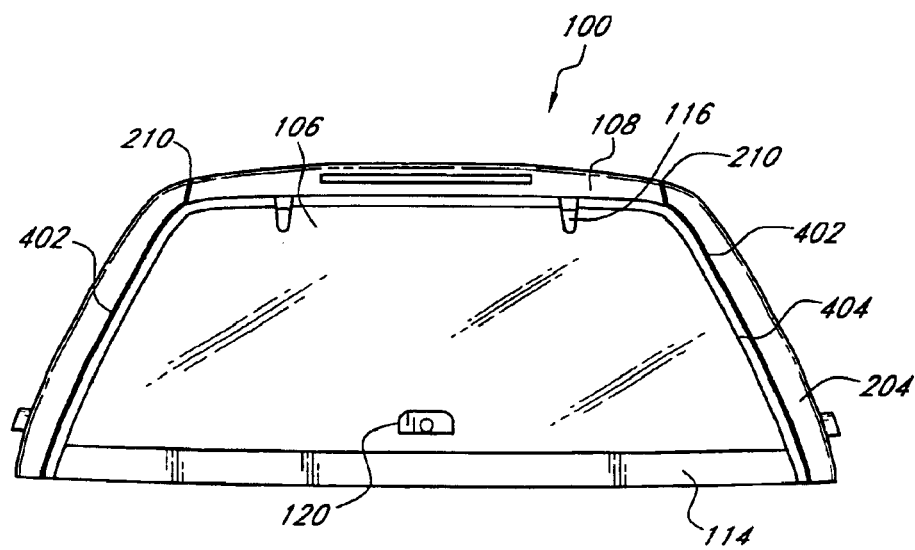
FIG. 4 is a rear view of one embodiment of the present truck shell detailing the rear seam lines of the outer side walls.
Figure 5:
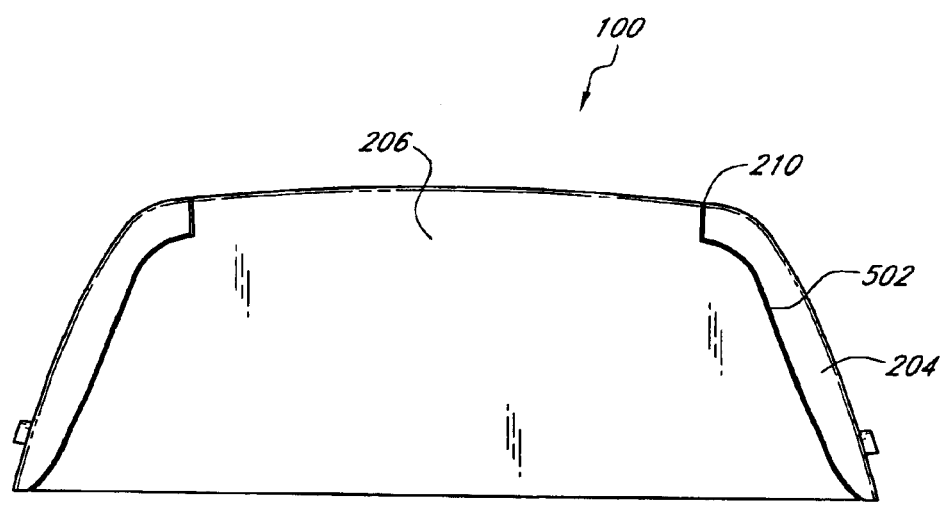
FIG. 5 is a front view of one embodiment of the present truck shell detailing the front seam lines of the outer side walls.

FIG. 6 further illustrates that that an upper inwardly extending lateral section 714 is positioned on an upper edge 715 of the planar surface 711 of the outer sidewall 204. A mounting surface 710 is preferably positioned at the end of the inwardly extending section 714. As is illustrated in FIGS. 4 and 5, the side walls 204 of the shell 100 are generally slanted outward so as to be farther apart at the bottom edge than at the edge adjacent the ceiling section 108. To achieve a more aerodynamic shape, the inwardly upper extending lateral section 714 of the movable walls 204a, 204b extends inward such that the mounting surface 710 can be attached to a vertical mounting surface 712 of the ceiling section 108 thereby positioning the seamed interface between the outer side wall 204 and the truck shell 100 adjacent the ceiling section 108 rather than on the side wall 104.

The outer side wall 204 is hingedly attached at its upper edge by a pair of cooperating hinges 208 that define a side wall hinge line 210. As shown in FIG. 2, and more specifically in FIG. 6, the outer side wall 204 has a surface 710 that mates with a mounting surface 712 of the ceiling 108, to form an interface therebetween when the outer side wall 204 is in a closed configuration (FIG. 1). In the closed position as illustrated in FIG. 1, the mounting surface 710 of the outer side wall 204 is aligned so as to be parallel with the vertical mounting surface 712 of the ceiling section 108. Since the ceiling section 108 is generally vertically positioned, the interface 210 defined by the hinges is generally positioned on the ceiling surface 108 of the shell rather than on the side surface thereby reducing the visibility of the interface.

In one embodiment, the hinge 208 is made up of two mounting portions 708 rotatably connected by a pin (not shown), as is known in the art. The mounting halves are securely mounted, such as by screws, to the outer side wall mounting surface 710 and top ceiling mounting surface 712, thus allowing the outer side wall 204 to pivot about the hinge line 210 created along the longitudinal axis of the hinges 208. In an alternate embodiment, a single hinge may be used to pivotally connect the outer side wall 204 and top ceiling 108. Alternatively, a plurality of discrete hinges may pivotally connect the components.

With continued reference to FIGS. 2 and 6, the front most part of the outer side wall 204 toward the truck cab includes an inward flange 212 that is generally perpendicular to the main planar surface of the outer side wall 204 and is adjacent to the front wall 206 (See FIG. 5). Likewise, as shown in FIG. 6, the rear of the outer side wall 204 includes an inward flange 214 that is generally perpendicular to the planar direction of the outer side wall 204 and is adjacent to the closed rear wall 106. In this way, the lateral seams of the outer side wall 204 are located on the front and rear of the shell 100, and thus, are not visible from a side view of the shell 100. By extending the outer side wall or door 204 so as to extend beyond the support walls 202, the length of the opening in the support wall 202 can be lengthened thereby increasing the access to the interior of the pick up truck bed.

One motivation for installing a truck shell is to prevent water from entering the truck bed and possibly damage articles carried therein. However, in creating a hinge connection between the support wall 202 and outer side wall 204 there will usually be a gap therebetween to accommodate the hinge 208. The effect of allowing a gap, especially when the hinge line 210 is positioned adjacent the top ceiling 108, is that water may be free to drain through the gap separating the top ceiling 108 and outer side wall 204, and possibly enter the cargo area of the pick up truck. The gap may be reduced by forming recesses in the outer side wall surface 710 and top ceiling mounting surface 712 dimensioned to receive the hinge mounting portions 708. Additionally, a barrier, such as a gasket or weather strip, may be positioned in the gap to further aid in inhibiting water penetration.

Nevertheless, water may still occasionally penetrate through the side wall hinge line 210. For this reason, among others, a moisture flange 216 is provided which creates a trough that directs any water away from the window cutout area and to the exterior of the truck bed.

Figure 7:
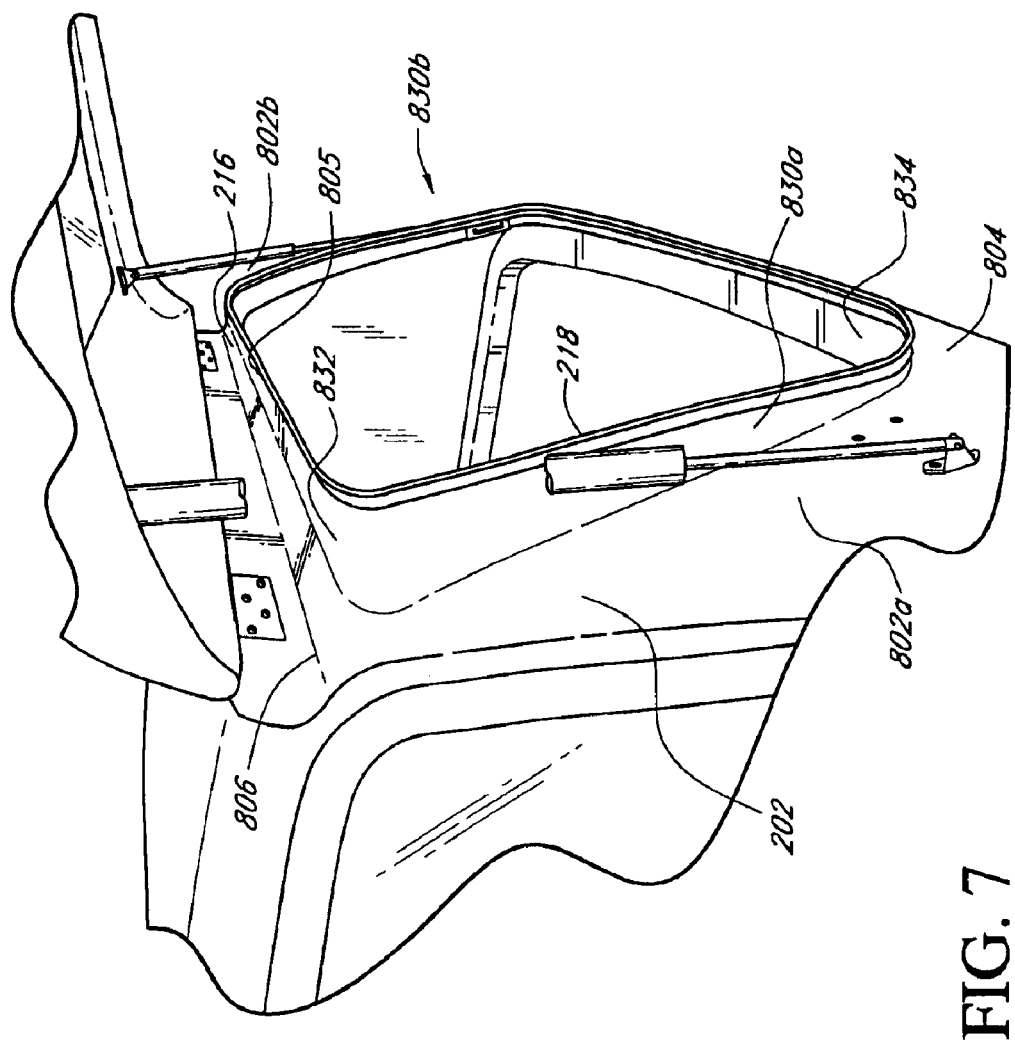
FIG. 7 is a close-up perspective view of the support wall and moisture flange.

As more particularly depicted in reference to FIG. 7, the moisture flange 216 is defined by the support wall 202 along one edge, and a trough which terminates at an opposing lip edge 805 located a distance away from the support wall 202. As is illustrated in FIGS. 6 and 7, the moisture flange 216 includes a first and second side members 830a, 830b that extend generally perpendicularly outward from the first and second support sections 802a, 802b. A top member 832 and a bottom member 834 extend between the first and second side members 830a, 830b and extend generally perpendicularly outward from the upper and lower lateral sections 806, 804 respectively. As illustrated, the side members 830a, 830b are tapered such that at the upper end 832, the side members 830a, 830b are wider. This results in the opening 810 being generally planar and thereby accounts for the angle of the support sections 802a, 802b.

The top member 832 of the moisture flange 216 is shaped such that it is concave from the upper lateral support 806 to the lip edge 805, thus forming a trough shape. It is further shaped such that any collected water will egress out of either end of the moisture flange 216 rather than pool at the base of the concavity. The water egress is further encouraged by the rake angle at which the moisture flange 216 is oriented by virtue of being mounted to a pick up truck. A rake angle is formed by a vehicle's stance based on the vehicle's design. The rake angle may be altered by after market tires, shocks, or "trick kits" for lifting or lowering the vehicle's ground clearance, among other things. The result is that the moisture flange will likely be oriented at a forward or rearward angle sufficient to direct the collected water out of the moisture flange 216 and down the support wall 202. Of course, an angle could also be designed into the moisture flange 216.

To further direct the egress of water away from the truck bed, the support wall 202 is configured such that it terminates at a lower extremity that is substantially even with the outer edge of the truck bed as shown in FIG. 2, and the water is allowed to flow harmlessly to the exterior of the truck bed. The overall result is a trough that captures and directs the penetrating water flow down the support wall and to the exterior of the truck bed, thus inhibiting water from entering the truck bed and potentially damaging any articles carried therein.

As shown in FIGS. 2 and 7, a sealing member 218, such as a gasket, is attached to the lip 805 of the moisture flange 216. The sealing member 218 may be attached to the moisture flange 216 by any known manner, for example adhesive, heat bonding, friction, or the like. The outer side wall 204 and moisture flange 216 are configured such that the outer sidewall 204 contacts the sealing member 218 when closed to create a substantially watertight seal. The outer side wall 204 is movable between an open and closed position. The range of motion in the open direction of the outer side wall 204 is constrained by either the range of motion of the hinges, the maximum extended length of the support struts 222, or both. The outer side wall's 204 maximum range of motion toward the closed position is reached when the outer side wall 204 is fully closed. The fully closed position occurs when the outer side wall 204 is latched into position, as will be discussed in greater detail hereinafter. The moisture flange 216 is configured such that the sealing member 218 contacts the outer side wall 204 when the outer side wall 204 is fully closed. To create the substantially watertight seal, it is preferable that the sealing member becomes slightly compressed upon engaging the outer side wall 204.

With reference to FIGS. 2 and 6, a transparent window 122 may be integrated into the outer side wall 204 to cooperate with the window cutout area defined by the periphery of the moisture flange 216. The window is preferably sized and positioned such that the window 122 at least fills the window cutout area 810. In one embodiment, glass is used for the window 122.

To gain access to cargo in the truck bed, the outer side wall 204 is opened thus exposing the opening 810 and granting access to the truck bed. Once the outer side wall 204 is opened, it is preferable to maintain it in this position so that a person may access the truck bed without having to hold the outer side wall 204 in position. To accomplish this, a support strut 222 may be utilized. One end of the support strut is preferably mounted to the inner side wall 202 in a conventional manner, such as by screws, bolts, or rivets, while the opposite end of the support strut 222 is fastened to the outer side wall 204 in a similar manner. A support strut may comprise a cylinder containing either gas, a spring, or both, and a piston slidable within the cylinder. As the outer side wall 204 is closed, the piston is forced through the cylinder, thus compressing either the spring or gas. In this manner, the strut 222 is biased in a fully extended position by a spring force, or by the compressive resistance of the contained fluid. The outer side wall 204 is biased into an open position by the support strut 222, as shown, such that when the pull latch 118 is actuated, the outer side wall 204 raises with little or no additional effort. Preferably, this biasing force is balanced against the weight of the outer side wall 204 and does not require a great deal of effort to overcome to subsequently lower and close the outer side wall 204.

As can be seen in FIG. 2, easy access to the truck bed is granted when the rear wall 106 and outer side walls 204 are open. Furthermore, the location of the side wall hinge line 210 allows the outer side wall 204 to swing up and out of the way to reduce the risk of a head injury to someone accessing cargo in the truck bed.

Figure 3:
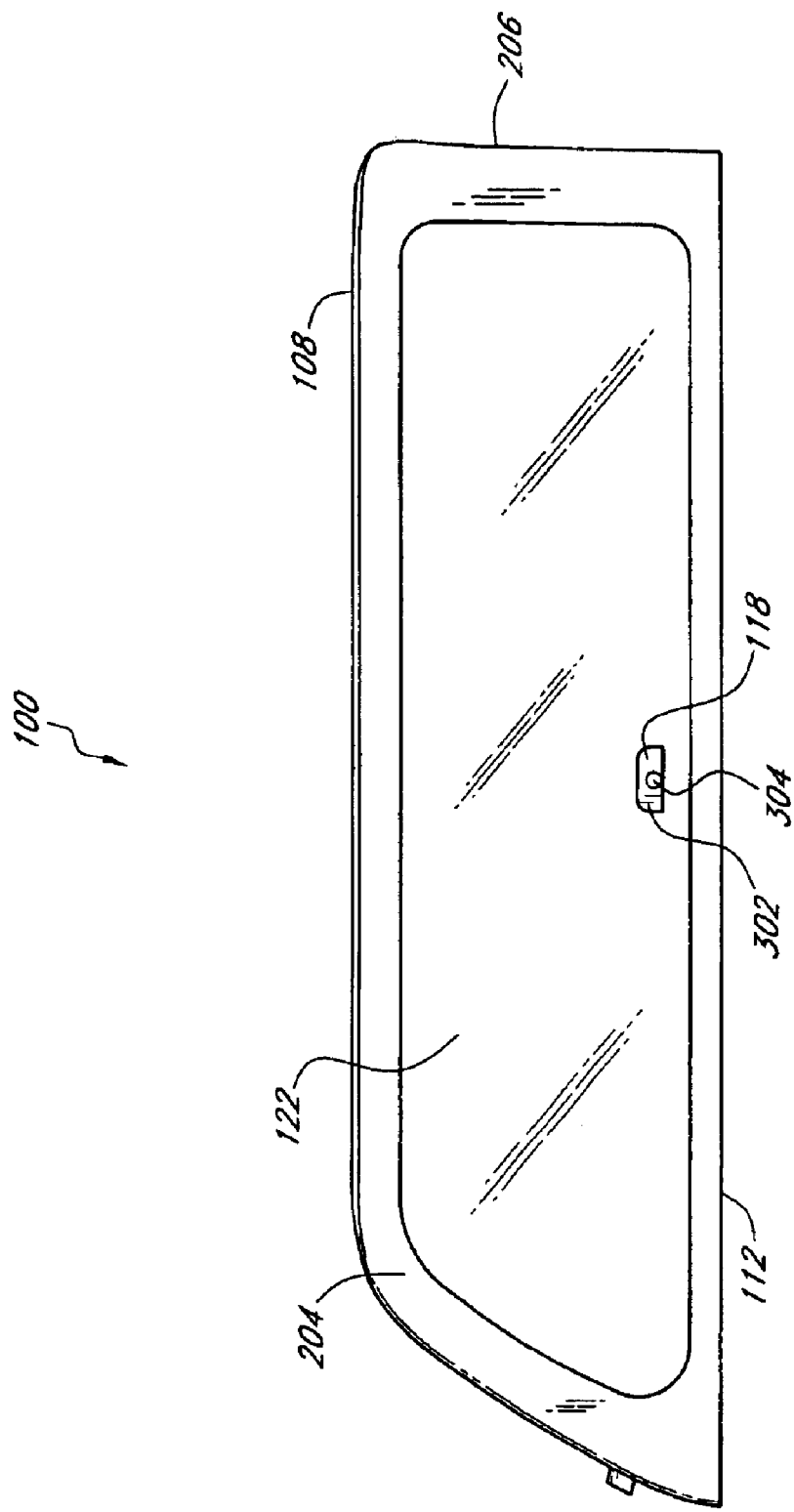
FIG. 3 is a side view of one embodiment of the present truck shell.

Turning now to FIG. 3, a side view of the shell 100 is depicted and described. The outer side wall 204 has a form that preferably continues the basic shape and flow of the truck to which it is to be attached. Because truck bed dimensions differ between models and manufacturers, a separate shell must be made for each production truck model. Consequently, designing and producing a plurality of different truck shells presents economic difficulties. One way to efficiently produce many different shells is by making and using fiberglass molds. As is known in the prior art, moldable attachments for trucks and automotive vehicles generally include a phenolic saturated fiberglass mat molded into a desired shape. In a secondary step, a cloth decorative outer layer may be attached to the part to hide imperfections in the raw fiberglass. Alternatively, the fiberglass may be sanded and finished to eliminate surface imperfections. Once an initial mold is created, this process can be repeated to economically create multiple parts.

In one embodiment, a single mold is used to create the front wall 206, top ceiling 108, and support walls 202 with the integrated moisture flange 216. Additional molds are used to create the left and right outer side walls 204, which are subsequently attached as previously described. After attachment of the outer side walls, the component parts are worked, such as by sanding and buffing, to create a continuous final shape.

A pull latch 118 is attached to the outer side wall 204 to provide a handle for actuating the latch mechanism mounted on the inside of the shell, which will be described in detail hereinafter. Notably, from this vantage point, there are no visible seams where the outer side wall 204 contacts the remainder of the shell 100. The seam lines are located on the top, front, and rear surfaces, and thus, are not visible from this side view. This allows the entire outer side wall 204 to be opened to allow maximum access to the truck bed.

Now referencing FIG. 6, a cutaway perspective view of one outer side wall 204 is shown and described in conjunction with the latch mechanism. A brief reference to FIG. 3 shows that a pull latch comprises a handle portion 302 and a cylindrical portion 304. The cylindrical portion 304 protrudes through the outer side wall 204 and biases the handle portion 302 to the outer side wall 204. The two portions are configured such that pulling on the handle portion 302 also displaces the cylindrical portion 304. The cylindrical portion 304 further has a standard lock therein that, when locked, prevents movement of the attached handle portion 302. Now returning to FIG. 6, the cylindrical portion 304 protrudes through the outer side wall 204 and an interior view of the cylindrical portion 304 shows that a pair of pull cables 702 have one end attached to the cylindrical portion 304 while the opposite end of the pull cables 702 is attached to a receiving latch 704. As the outer side wall 204 closes, the receiving latch 704 engages the retaining member 706, which causes the receiving latch 704 to pivot and close around the retaining member 706 mounted to an interior portion of the moisture flange 216. The receiving latch 704 is configured to remain locked onto the retaining member 706 until an outside force, such as from the pull cable 702, is applied. In this manner, the outer side wall 204 is maintained in a closed position. As the pull latch 118 is pulled outwardly, its outward displacement causes the pull cable 702 to tension, thus translating a releasing force to the receiving latch 704. In one embodiment, the receiving latch 704 is only releasable by a force exerted on it by the pull cable 702. Therefore, when the pull latch 118 is locked into position such that it cannot be actuated from outside the vehicle, the outer side wall 204 cannot be opened from outside the vehicle. However, the cylindrical portion 304 of the pull latch 118 is not constrained from rotational movement, and when the interior portion of the pull latch 118 is rotated from inside the vehicle, the pull cables 702 are tensioned which translates a releasing force to the receiving latch 704. In this way, when locked, the outer side wall 204 can only be opened from the inside. This preferred embodiment describes a pair of pull cables 702; however, a single pull cable can be attached to both receiving latches 704, and pass through a hole formed in the pull latch 118 to achieve the same result.

The latching hardware, including the pull cables and receiving latch, can optionally be covered (as shown in FIG. 2 at 224), thus hiding the hardware on the inside of the vehicle, and protecting it from damage from shifting cargo.

Accordingly, it is now apparent that the truck shell 100 envisioned herein will permit increased access to the bed of a pick up truck by providing openable side doors. More specifically, the entire side wall of the shell is openable to permit increased access. Additionally, a moisture flange is provided for maintaining a substantially water tight seal with the side door to inhibit water from entering the truck bed and potentially damaging cargo carried therein.

Although the description above contains many specific examples, these should not be construed as limiting the scope but as merely providing illustrations of some of the presently preferred embodiments. Thus, the scope of the invention should be determined by the following claims, rather than by the examples given.

What is claimed is:

1. A shell for a motor vehicle, the shell being attachable to a chassis of the motor vehicle so as to, in combination therewith, define an enclosed cargo compartment wherein the shell comprises:

at least one side opening aligned generally with an exterior side surface of the vehicle;

an outer side wall hinged generally aligned with an upper edge of the exterior side surface and completely covering the at least one side opening such that, in an open position, access is provided to the cargo compartment via the side opening;

a rear opening; and an outer rear wall covering the rear opening such that, in an open position, access is also provided to the cargo compartment via the rear opening and wherein, in closed positions, the outer rear wall and outer side wall substantially abut each other.

2. The shell of claim 1, wherein the shell is removably attachable to the chassis.

3. The shell of claim 1, wherein the outer side wall is at least partially transparent.

4. The shell of claim 1, further comprising a latch securing the outer side wall in a closed position.

5. The shell of claim 4, wherein the latch, in a locked position, locks the outer side wall in the closed position from the outside the vehicle and is operable from inside the cargo compartment to unlock the outer side wall from the closed position.

6. The shell of claim 1, wherein the shell further comprises a moisture flange extending generally horizontally outwardly from the periphery of the at least one side opening wherein the moisture flange is configured to direct incident water around the at least one side opening.

7. The shell of claim 6, further comprising a seal member attached to the moisture flange wherein, in the closed position, the seal member resiliently compresses against the outer side wall so as to seal the at least one side opening.

8. The shell of claim 6, wherein the outer side wall overlaps the moisture flange along at least upper and opposite side portions thereof.

9. The shell of claim 1, wherein the hinged connection of the outer side wall is covered by the outer side wall in at least a closed position.

10. The shell of claim 1, wherein the abutment of the outer rear and side walls is positioned along a rear surface of the shell.

11. The shell of claim 1, wherein the outer side wall comprises a generally planar surface and inwardly extending flanges at front and rear edges thereof wherein, in a closed position, the planar surface is generally parallel with the opening and the flanges extend generally perpendicular thereto.

12. A shell for a motor vehicle, the shell being attachable to a chassis of the motor vehicle so as to, in combination therewith, define an enclosed cargo compartment wherein the shell comprises:
   at least one side opening;
   a moisture flange extending generally in horizontal planes outwardly from the periphery of the at least one side opening at top and bottom portions of the flange and generally in vertical planes at side portions of the flange wherein the moisture flange is configured to direct incident water around the at least one side opening;
   a movable outer side wall covering the at least one side opening such that, in an open position, access is provided to the cargo compartment via the side opening;
   a rear opening; and
   an outer rear wall covering the rear opening such that, in an open position, access is provided to the cargo compartment via the rear opening wherein, in closed positions, the outer rear wall and outer side wall substantially abut each other.

13. The shell of claim 12, wherein the shell is removably attachable to the chassis.

14. The shell of claim 12, wherein the outer side wall is at least partially transparent.

15. The shell of claim 12, further comprising a latch securing the outer side wall in a closed position.

16. The shell of claim 15, wherein the latch, in a locked position, locks the outer side wall in the closed position from the outside the vehicle and is operable from inside the cargo compartment to unlock the outer side wall from the closed position.

17. The shell of claim 12, further comprising a seal member attached to the moisture flange wherein, in the closed position, the seal member resiliently compresses against the outer side wall so as to seal the at least one side opening.

18. The shell of claim 12, wherein the outer side wall overlaps the moisture flange along at least upper and opposite side portions thereof.

19. The shell of claim 12, wherein the outer side wall is pivotably movable.

20. The shell of claim 12, wherein the abutment of the outer rear and side walls is positioned along a rear surface of the shell.

21. The shell of claim 12, wherein the outer side wall comprises a generally planar surface and inwardly extending flanges at front and rear edges thereof wherein, in a closed position, the planar surface is generally parallel with the opening and the flanges extend generally perpendicular thereto.

22. A motor vehicle comprising:
   a chassis defining a passenger compartment; and
   a shell attached to the chassis so as to define an enclosed cargo compartment wherein the shell comprises:
      at least one side opening aligned generally with an exterior side surface of the vehicle;
      an outer side wall hinged generally aligned with an upper edge of the exterior side surface and completely covering the at least one side opening such that, in an open position, access is provided to the cargo compartment via the side opening;
      a rear opening; and
      an outer rear wall covering the rear opening such that, in an open position, access is provided to the cargo compartment via the rear opening and wherein, in closed positions, the outer rear wall and outer side wall substantially abut each other.

23. The motor vehicle of claim 22, wherein the shell is removably attached to the chassis.

24. The motor vehicle of claim 22, wherein the outer side wall is at least partially transparent.

25. The motor vehicle of claim 22, further comprising a latch securing the outer side wall in a closed position.

26. The motor vehicle of claim 25, wherein the latch, in a locked position, locks the outer side wall in the closed position from the outside the vehicle and is operable from inside the cargo compartment to unlock the outer side wall from the closed position.

27. The motor vehicle of claim 22, wherein the shell further comprises a moisture flange extending generally horizontally outwardly from the periphery of the at least, one side opening wherein the moisture flange is configured to direct incident water around the at least one side opening.

28. The motor vehicle of claim 27, further comprising a seal member attached to the moisture flange wherein, in the closed position, the seal member resiliently compresses against the outer side wall so as to seal the at least one side opening.

29. The motor vehicle of claim 27, wherein the outer side wall overlaps the moisture flange along at least upper and opposite side portions thereof.

30. The motor vehicle of claim 22, wherein the hinged connection of the outer side wall is covered by the outer side wall in at least a closed position.

31. The motor vehicle of claim 22, wherein the abutment of the outer rear and side walls is positioned along a rear surface of the shell.

32. The motor vehicle of claim 22, wherein the outer side wall comprises a generally planar surface and inwardly extending flanges at front and rear edges thereof wherein, in a closed position, the planar surface is generally parallel with the opening and the flanges extend generally perpendicular thereto.

* * * * *